July 24, 1962 SHINRO FUKUDA ET AL 3,046,158

PROCESS FOR PRODUCING MAGNETIC MATERIAL

Filed Nov. 27, 1959

United States Patent Office 3,046,158

Patented July 24, 1962

3,046,158

PROCESS FOR PRODUCING MAGNETIC MATERIAL

Shinro Fukuda, Ashigarakami-gun, and Hiroshi Goto, Goro Akashi, and Tokuaki Miyake, Odawara-shi, all of Kanagawa-ken, Japan, assignors to Fuji Photo Film Co., Ltd., Ashigara-Kamigun, Kanagawa, Japan, a company of Japan Filed Nov. 27, 1959, Ser. No. 855,709
Claims priority, application Japan Dec. 31, 1958
3 Claims. (Cl. 117—100)

Figure 1:
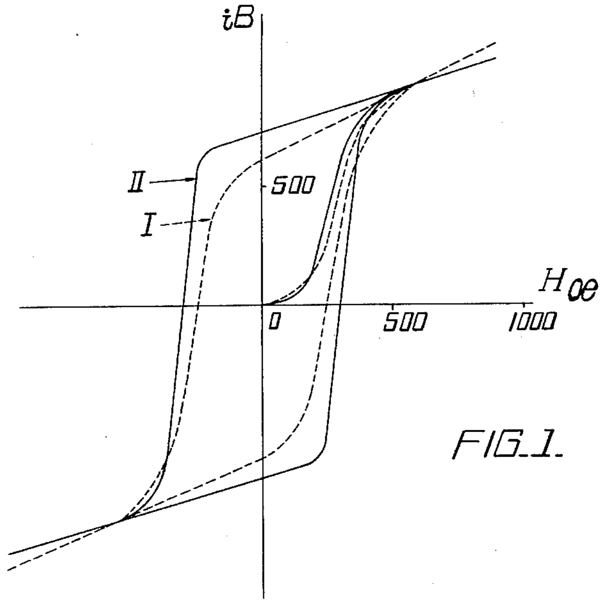

The present invention relates to a process for the production of magnetic material suitable for magnetic tapes and the like, and particularly to a process which comprises adding thin elongated particles of metallic material having iron oxide at least on the surface to a solution of iron salt and adding an alkali compound to the solution thereby to precipitate and deposit magnetite on the nuclei to grow them, whereby particles of magnetic material are grown in the form of rods or spindles each having a nucleus as its core.

In a magnetic tape with respect to which recording is effected in only one direction, it is preferable for the crystalline particles of magnetic material used therefor to have a shape developed only in one direction such as, for example, like a needle. It has already been proposed to produce magnetic material having a thin elongated form by heating non-magnetic ferric oxide in the form of a needle-shaped crystalline particle of a maximum dimension of less than 6$\mu$. This process provides magnetic material of a thin elongated form but the product of the process and the process itself have various disadvantages as described hereinafter.

We have found that when filamentary or needle-shaped seeds are used and $Fe_3O_4$ type magnetite is precipitated and accumulated on the seeds by wet reaction, crystalline particles in the form of a rod or a spindle of ferro-magnetic material can be directly obtained and ferro-magnetic material superior to known products can be obtained.

According to a known process, Goethite ($Fe_2O_3 \cdot H_2O$) having the form of a needle which has been grown for a long time is reduced in, for example, a mixture of hydrogen and steam, or coal gas at a temperature of about 300° C.–400° C. to produce magnetite ($Fe_3O_4$) which is then oxidized at about 250° C. to make $\gamma$-hematite ($\gamma$—$Fe_2O_3$). This process is not only complicated but also involves a dangerous operation such as hydrogen reduction. Accordingly it has long been desired to have a more satisfactory process. The present invention meets this long cherished desire and provides a process by which ferro-magnetic material is directly and easily produced. It is further possible to produce magnetic materials of various different compositions.

The known process not only has disadvantages in being complicated and due to the danger involved therein as stated above, but also has various defects in its product. The crystalline particle produced is somewhat porous and has the nature of an aggregation of finely divided primary particles rather than being a unitary needle particle. In fact the patricle is not a needle particle in the proper sense. As the result, when such particles are oriented, the effect attained is appreciably less desirable than the effect which might be expected theoretically if they were truly needle particles. In contrast, the particles obtainable by the process of the present invention are truly needle particles and when they are oriented, a much superior effect is obtained than with the product of the conventional process.

Figure 2:
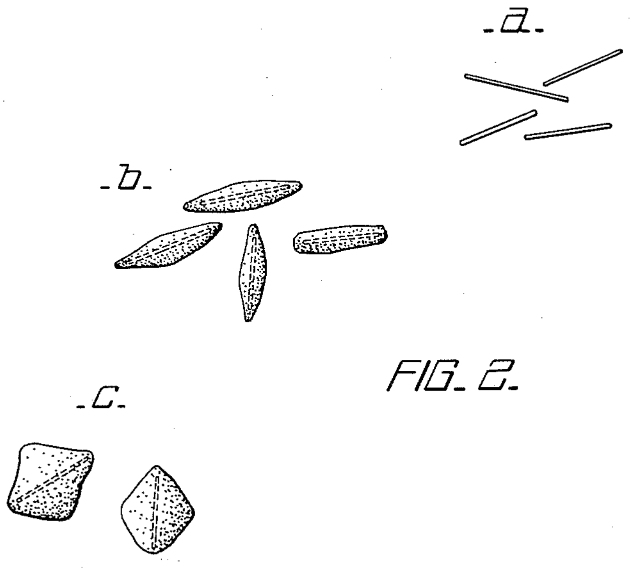

For better understanding of the present invention, it will next be explained more fully with reference to the drawing, wherein:

FIG. 1 is a curve showing the magnetic characteristics of a tape in which the magnetic material of the present invention is used in comparison with that of a tape of conventional magnetic material, the density of magnetic flux being shown by the ordinate and the intensity of the magnetic field being shown by the abscissa respectively; and FIGS. 2*a–c* are respectively schematic views on enlarged scale of nuclei, particles of magnetic material grown to an adequate degree and particles of magnetic material grown to an excessive degree.

According to the present invention, seeds, which are in the form of needles as shown in FIG. 2*a*, are introduced into a solution of iron salt and a precipitate of magnetite composition is deposited and accumulated on said seeds while the solution is vigorously agitated thereby forming particles in the form of rods or spindles as shown in FIG. 2*b*.

We have confirmed by tests that the precipitation and accumulation of magnetite for the growth of the seeds can be attained either by oxidation of ferrous salt or by reduction of ferric salt or by co-precipitation of ferrous ion and ferric ion.

The magnetite particle obtained by the process of the present invention has a core of the composition which is the same as that of the material used for the seed, but the major portion of the particle, namely the grown portion, has the composition of magnetite. As usually seen in wet reaction, the ratio between $Fe^{++}$ ions and $Fe^{+++}$ ions may often be deviated to some extent from the ratio of 1:2 of magnetite and the product may often have some water content in the order of a few percent or the anion of used iron salt to some extent.

When the seeds are grown excessively, the product becomes too thick in relation to the length as shown in FIG. 2*c* and the magnetic property thereof will be deleteriously affected. Accordingly, it is important not to permit excessive growth. It has been found that it is preferable to control the growing operation to make the mean ratio of the length to the thickness at least 2, the maximum length of the particles being less than 1.0$\mu$.

When magnetite particles are obtained by the process as described above, they are dehydrated in the atmosphere or in vacuum under heating and they are used for magnetic recording. The particles may be transformed to $\gamma$-hematite ($\gamma$—$Fe_2O_3$) by oxidizing in air by a mild heating at at a temperature from about 200° C. to 300° C. It is also possible, after producing $\gamma$-hematite, to revert it to magnetite by treating said $\gamma$-hematite with hydrogen or carbon monoxide. If the reduction is further advanced, the product may be made into metallic iron.

FIG. 1 illustrates the magnetization curve (II) for a magnetic tape manufactured by using $\gamma$-hematite particles derived from magnetite obtained by the process described in Example 1 presented hereinafter and the magnetization curve (I) for a magnetic tape manufactured by using $\gamma$-hematite particles in the form of a needle obtained by the conventional process in comparison. Both of the tapes have particles oriented by magnetic field treatment at the time of coating. The characteristic properties of these two tapes are as set forth in the following table:

| | Coercive force, iHc | Maximum residual induction, $Br^{max.}$ | Maximum magnetic induction, $iB^{max.}$ | Maximum gradient of initial magnetization curve, $(\Delta iB/\Delta H)^{max.}$ |
|---|---|---|---|---|
| | | Gauss | Gauss | |
| I. Conventional | 250 | 600 | 910 | 9.5 |
| II. Present invention | 300 | 740 | 900 | 13.0 |

The composition of the magnetic particles in both is $\gamma$—$Fe_2O_3$, but there is a great difference in characteristics particularly in maximum gradient of the initial magnetization curve between the two and the superiority of the product of the present invention is readily observed.

*Example 1*

To 5 l. of ¼ molar solution of ferrous sulfate are added 5 l. of ¼ molar solution of caustic soda and the mixture is agitated in air for 10 hours at 30° C. The initial green white precipitate becomes yellow filamentary particles of ferric oxide hydrate ($Fe_2O_3 \cdot H_2O$). These particles have a length of about 0.7μ and a width of about 0.05μ. (By adjustment of reaction temperature and concentration, the size of the particles may be varied to a length of about 0.5μ and a width of about 0.02μ.) These filamentary particles of ferric oxide hydrate are used in the following operation as nuclei.

Thereafter 50 l. of ⅛ mol solution of ferric chloride ($FeCl_3 \cdot 5H_2O$) and 50 l. of 1/16 mol solution of ferrous sulfate ($FeSO_4 \cdot 7H_2O$) are mixed and to this mixture is added the filamentary particles of ferric oxide hydrate mentioned above after a washing thereof with water, and the mixture is heated in a sealed vessel containing nitrogen at 50° C. Then 3 l. of 1 mol solution of caustic soda are added at constant dripping rate during a period of five hours while the mixture is being vigorously agitated. Thereafter the temperature of the mixture is raised to 80° C. and maintained at this temperature for one hour.

A black precipitate is obtained which is mostly constituted by particles of a spindle form having a length of about 0.7μ and with a width of about 0.15μ and partly contains finely divided particles of magnetite in admixture. (When the treated mixture is maintained for about 5 hours after raising the temperature to 80° C., all the precipitate is in the form of spindles.) The composition of the precipitated particle is magnetite and contains water to some degree. The shape of the particles is as illustrated in FIG. 2*b*.

*Example 2*

In the preceding example, after adding the nuclei to the reaction liquid, 5 l. of 1 mol solution of caustic soda are added at once to the reaction liquid maintained at 40° C. and the reaction liquid in this condition is stirred for 2 hours and then the temperature thereof is raised to 80° C.

When observed with an electron microscope, it is found that to the surface of the nucleus are adhered magnetite particles. Then 20 l. of 1 mol solution of caustic soda are dripped at a constant rate for a period of 3 hours into the reaction liquid and after the completion of dripping, the mixture is left for three hours at the same temperature. The particles obtained have a mean length of 0.8μ and a mean width of 0.1μ and are in the form of rods or spindles.

*Example 3*

The filamentary nuclei obtained in Example 1 are converted to magnetite by reducing the same at 300° C. with hydrogen and steam, and they are directly added to the reaction liquid of Example 1 without exposing them to air. The operations conducted thereafter are the same as those in Example 1. In this example, the nuclei become slightly massive due to the heat treatment and the dispersability thereof in somewhat lowered, but the capability of functioning as nuclei is improved and the nuclei can grow easily with precipitated material depositing thereon. The reason for the speedy growth of the nucleus is considered to be either the fact that the composition of the nucleus is magnetite which facilitates the growth of the crystal or the magnetic pulling force which attracts precipitated magnetite particles to promote the growth.

The magnetite particles thus obtained are particles of the form of rods or spindles of a mean size of a length in the order of 1μ and a width of 0.15μ which has to some degree of the nature of aggregation.

*Example 4*

The nuclei obtained in Example 3 are washed with dilute water solution of sulfuric acid (pH 2.5) and made ready for addition.

50 l. of aqueous solution of ¼ mol iron sulfate ($FeSO_4 \cdot 7H_2O$) is heated at 70° C. and thereto are added a small quantity of copper sulfate ($CuSO_4 \cdot 5H_2O$) and 100 g. of ammonium nitrate ($NH_4NO_3$) and then the nuclei described above are added to the mixture.

6 l. of ½ mol solution of caustic soda are dripped into the mixture at a constant rate over a period of 10 hours. It is observed that colloidal ferrous hydroxide produced by reaction of ferrous sulfate and caustic soda is speedily converted to finely divided particles of magnetic under the catalytic action of $Cu^{++}$ ion present and the presence of $Cu^{++}$ ion is effective in causing the deposit of magnetite on the nucleus to promote its growth.

The mean size of the magnetite particles thus obtained in the form of rods is about 0.6μ in length and about 0.1μ in width.

*Example 5*

In place of the nucleus of Example 1, zinc oxide in the form of a needle having colloidal magnetite adsorbed on its surface is used as the nuclei and the operations are conducted in the same conditions as Example 1. Particles of magnetite in a spindle form similar to Example 1 are obtained although they are a little more irregular than those of Example 1.

As seen from the examples described above, the nuclei used in the present invention are not limited to iron oxide but may be any other material in general which has absorbtive or adhesive property for magnetite and has a form of rods or needles. For instance, in place of zinc oxide in Example 5, any material in the form of a needle-shaped having a thin coating of iron oxide may be used as the nucleus particle in the process of the invention.

For forming a thin coating layer on the surface, particles of an adequate material in the form of a needle may be soaked in a solution of iron salt and then heated at a temperature in the order of 500° C. to form a thin coating layer of iron oxide. Adhesion by vacuum evaporation may also be employed for the formation of coating layers of iron or iron oxide on the surfaces of needle particles.

What we claim is:

1. A process for producing magnetic materials of a form whereby the length is greater than the width comprising adding particles selected from the group consisting of zinc oxide and ferric oxide hydrate having a length less than about 6μ in a crystal form having a length to width ratio of about 6:1 to a solution of an iron salt having ferric and ferrous ions therein in the proportions necessary to form magnetic, adding alkali to the solution to precipitate the mixed hydrated ferrous and ferric oxides, agitating the solution, and allowing the solution to stand so as to deposit the mixed oxides on the particles.

2. A process for producing magnetic materials of a form whereby the length is greater than the width comprising adding particles of zinc oxide having a length less than about 6μ in a crystal form having a length to width ratio of about 6:1 to a solution of an iron salt having ferric and ferrous ions therein in the proportions necessary to form magnetite, adding alkali to the solution to precipitate the mixed hydrated ferrous and ferric oxides, agitating the solution, and allowing the solution to stand so as to deposit the mixed oxides on the particles.

3. A process for producing magnetic materials of a form whereby the length is greater than the width comprising adding particles of ferric oxide hydrate having a length less than about 6μ in a crystal form having a length to width ratio of about 6:1 to a solution of an iron salt having ferric and ferrous ions therein in the proportions necessary to form magnetite, adding alkali to the solution to precipitate the mixed hydrated ferrous and ferric oxides, agitating the solution, and allowing the solution to stand so as to deposit the mixed oxides on the particles.

References Cited in the file of this patent

UNITED STATES PATENTS 2,045,301 Langer ---------------- June 23, 1936

2,582,590 Heeren et al. ---------- Jan. 15, 1952
2,694,656 Camras ---------------- Nov. 16, 1954
2,848,310 Remeika --------------- Aug. 19, 1958

FOREIGN PATENTS 717,269 Great Britain ----------- Oct. 27, 1954